United States Patent
Hallman

(10) Patent No.: US 10,247,298 B2
(45) Date of Patent: Apr. 2, 2019

(54) RESILIENT BEARING PIN AND GEAR ASSEMBLIES INCLUDING RESILIENT BEARING PINS

(71) Applicant: General Electric Company, Schenectady, NY (US)

(72) Inventor: Darren Lee Hallman, Scotia, NY (US)

(73) Assignee: GENERAL ELECTRIC COMPANY, Schenectady, NC (US)

( * ) Notice: Subject to any disclaimer, the term of this patent is extended or adjusted under 35 U.S.C. 154(b) by 159 days.

(21) Appl. No.: 15/402,637

(22) Filed: Jan. 10, 2017

(65) Prior Publication Data

US 2018/0195601 A1 Jul. 12, 2018

(51) Int. Cl.
| | |
|---|---|
| F16H 57/08 | (2006.01) |
| F16H 1/28 | (2006.01) |
| F16C 25/08 | (2006.01) |
| F16C 19/28 | (2006.01) |
| F02C 7/36 | (2006.01) |
| F01D 25/16 | (2006.01) |

(52) U.S. Cl.
CPC ............ *F16H 57/08* (2013.01); *F01D 25/16* (2013.01); *F02C 7/36* (2013.01); *F16C 19/28* (2013.01); *F16C 25/08* (2013.01); *F16H 1/28* (2013.01); *F05D 2240/54* (2013.01); *F05D 2260/40311* (2013.01); *F05D 2300/501* (2013.01); *F16C 2361/61* (2013.01); *F16H 2057/085* (2013.01)

(58) Field of Classification Search
CPC .. F16H 57/08; F16H 1/28; F16C 19/28; F16C 25/08; F02C 7/36
See application file for complete search history.

(56) References Cited

U.S. PATENT DOCUMENTS

| | | | |
|---|---|---|---|
| 2,127,463 A | * | 8/1938 | Chilton ................. F16H 1/2836 475/159 |
| 4,460,284 A | | 7/1984 | Lauterbach et al. |
| 6,247,847 B1 | | 6/2001 | Lob |
| 6,896,491 B2 | | 5/2005 | Trubnikov |
| 8,123,413 B2 | | 2/2012 | Tambe et al. |
| 8,172,717 B2 | | 5/2012 | Lopez et al. |
| 8,198,744 B2 | | 6/2012 | Kern et al. |

(Continued)

FOREIGN PATENT DOCUMENTS

| | | |
|---|---|---|
| CN | 203698261 U | 7/2014 |
| CN | 203730144 U | 7/2014 |

(Continued)

OTHER PUBLICATIONS

Defaye et al., "Analysis of High-Speed Cylindrical Roller Bearing With Flexible Rings Mounted in a Squeeze Film Damper", International Joint Tribology Conference, pp. 387-389, Oct. 22-24, 2007.

(Continued)

*Primary Examiner* — Mark J Beauchaine
(74) *Attorney, Agent, or Firm* — GE Global Patent Operation; Nitin Joshi

(57) ABSTRACT

A bearing pin assembly includes a bearing pin including a substantially rigid pin body. The bearing pin assembly also includes a resilient section disposed about the substantially rigid pin body. The resilient section is configured to facilitate bending of the bearing pin during operational loading of the bearing pin.

15 Claims, 5 Drawing Sheets

(56) References Cited

U.S. PATENT DOCUMENTS

| | | | |
|---|---|---|---|
| 8,230,760 B1 | 7/2012 | Breeding | |
| 8,235,861 B2 | 8/2012 | Lopez et al. | |
| 8,287,423 B2 | 10/2012 | Lopez et al. | |
| 8,298,114 B2 | 10/2012 | Lopez et al. | |
| 8,371,799 B2 | 2/2013 | Spathias et al. | |
| 8,459,872 B2 | 6/2013 | Nies et al. | |
| 8,491,435 B2 | 7/2013 | Ghanime et al. | |
| 8,506,446 B2 | 8/2013 | Minadeo et al. | |
| 8,517,672 B2 | 8/2013 | McCooey et al. | |
| 8,550,955 B2 | 10/2013 | Erno et al. | |
| 8,550,957 B2 | 10/2013 | Erno et al. | |
| 8,657,714 B1 | 2/2014 | Ghanime et al. | |
| 8,696,314 B2 | 4/2014 | Mashue et al. | |
| 8,727,629 B2 | 5/2014 | Do et al. | |
| 8,727,632 B2 | 5/2014 | Do et al. | |
| 8,777,802 B2 * | 7/2014 | Erno | F16H 1/2836 475/346 |
| 8,857,192 B2 | 10/2014 | Huang et al. | |
| 8,900,090 B2 | 12/2014 | Sheridan | |
| 8,904,746 B2 | 12/2014 | Fang et al. | |
| 9,321,522 B2 | 4/2016 | Blades | |
| 2016/0047451 A1 | 2/2016 | Hoshina et al. | |
| 2016/0091019 A1 | 3/2016 | Katsaros et al. | |
| 2016/0201509 A1 | 7/2016 | Sheridan | |

FOREIGN PATENT DOCUMENTS

| | | |
|---|---|---|
| CN | 203730152 U | 7/2014 |
| CN | 102889341 B | 7/2015 |
| EP | 2803436 A2 | 11/2014 |

OTHER PUBLICATIONS

Leblanc et al., "Nonlinear Dynamic Analysis of Cylindrical Roller Bearing with Flexible Rings", Journal of Sound and Vibration, pp. 145-160, vol. 325, Issues 1-2, Aug. 7, 2009.

Kock, "Adjustable Support Bearing", IP.Com, https://priorart.ip.com/IPCOM/000242857, Aug. 26, 2015, (4 pages).

J W Lund, "Stability and Damped Critical Speeds of a Flexible Rotor in Fluid-Film Bearings", Journal of Engineering for Industry, vol. 96, Issue: 2, pp. 509-517, May 1, 1974.

Lee et al., "Cranktrain system geometry optimisation and dynamic assembly of parametric solid models", International Journal of Vehicle Design, vol. 23, Issue: 1/2, pp. 16-29, 2000.

* cited by examiner

RESILIENT BEARING PIN AND GEAR ASSEMBLIES INCLUDING RESILIENT BEARING PINS

BACKGROUND

The field of the disclosure relates generally to an apparatus and system for gears in aviation engines and, more particularly, to an apparatus and system for a resilient gear in a gearbox in aviation engines.

Aircraft engines typically include a plurality of gearboxes including a plurality of gears. Gearboxes include power gearboxes and accessory gearboxes and may include epicyclic gear assemblies. Known epicyclic gear assemblies typically include an outer ring gear, a central or sun gear, and a plurality of planet gears disposed between the outer ring gear and the central gear and configured to engage both the ring gear and the central gear. During operation, a drive applies a rotational force to at least one of the ring gear, the plurality of planet gears, and the central gear, thereby inducing rotation of one or more of the other epicyclic gear assembly gears. Planet gears are often coupled together by one or more carriers by bearing pins extending through each planet gear. During operation, force is transmitted between the carriers and bearing pins inducing the bearing pins into misalignment within the planet gear. Such misalignment leads to premature wear of gear components, such as roller elements, and negatively impacts the overall efficiency of power transmission by the epicyclic gear assembly.

BRIEF DESCRIPTION

In one aspect, a bearing pin assembly is provided. The bearing pin assembly includes a bearing pin including a substantially rigid pin body. The bearing pin assembly also includes a resilient section disposed about the substantially rigid pin body. The resilient section is configured to facilitate bending of the bearing pin during operational loading of the bearing pin.

In another aspect, a gear having an axis of rotation is provided. The gear includes an outer gear rim, a plurality of roller elements disposed about the axis of rotation and radially inward of the outer gear rim, and a bearing pin assembly extending through the outer gear rim along the axis of rotation. The bearing pin assembly includes a bearing pin including a substantially rigid pin body. The bearing pin assembly also includes a resilient section disposed about the substantially rigid pin body. The resilient section is configured to facilitate bending of the bearing pin during operational loading of the bearing pin.

In yet another aspect, an epicyclic gear assembly is provided. The epicyclic gear assembly includes a sun gear, a ring gear, and a plurality of planet gears coupled to the ring gear and the sun gear. At least one planet gear of the plurality of planet gears includes an outer gear rim, a plurality of roller elements disposed about the axis of rotation and radially inward of the outer gear rim, and a bearing pin assembly extending through the outer gear rim along the axis of rotation. The bearing pin assembly also includes a resilient section disposed about the substantially rigid pin body. The resilient section is configured to facilitate bending of the bearing pin during operational loading of the bearing pin.

DRAWINGS

These and other features, aspects, and advantages of the present disclosure will become better understood when the following detailed description is read with reference to the accompanying drawings in which like characters represent like parts throughout the drawings, wherein.

Figure 1:
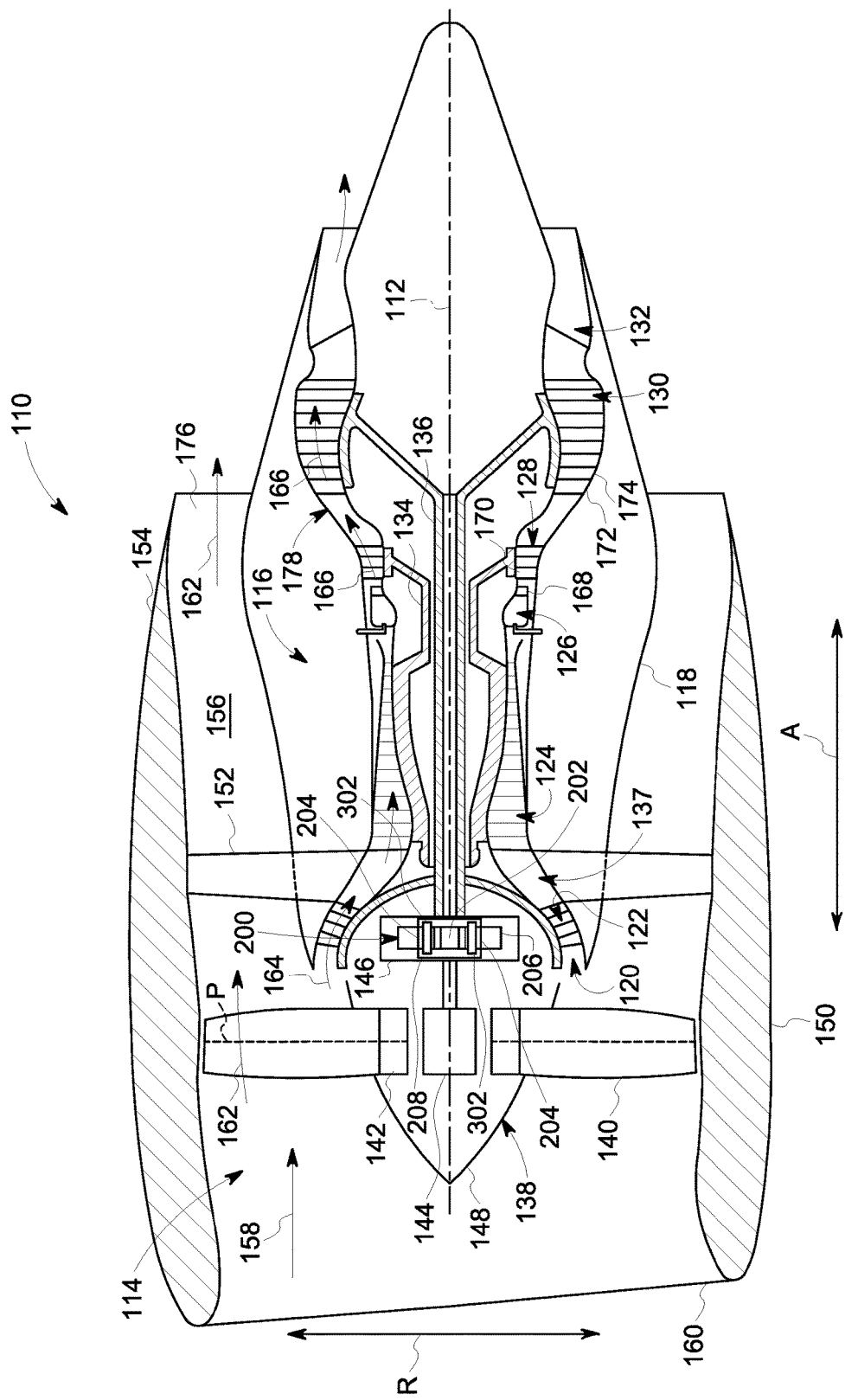
FIG. 1 is a schematic cross-sectional view of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the bearing pin assemblies described herein facilitate improved contact between the bearing pin and roller elements of a planet gear during operation of an epicyclic gear assembly. The bearing pin includes a forward end, an aft end opposite the forward end, and a substantially rigid pin body disposed between the forward end and the aft end. The bearing pin assembly also includes a resilient section disposed about the pin body. During operation, the resilient section is configured to bend or flex to maintain substantially even contact and loading of the roller elements. In the exemplary embodiment, the resilient section uses resilient properties to facilitate expansion and compression of the resilient section during operational loading of the bearing pin. In other embodiments, the characteristics of the resilient section are modified by the inclusion of one or more spring elements within the at least one void.

The bearing pin assemblies described herein offers advantages over known rigid bearing pins having a non-resilient structure. More specifically, rigid bearing pins by themselves are subject to misalignment relative to the gear rim through which they extend due to moments applied to the bearing pin during operational loading. Such misalignment induces uneven loading of roller elements disposed between the bearing pin and the gear rim. As a result, the roller elements are subject to uneven wear, increasing the likelihood of their failure and/or the frequency with which the roller elements must be replaced or otherwise maintained. Misalignment further decreases the efficiency with which forces are transmitted through an epicyclic gear assembly in which rigid bearing pins are used.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section 123, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. In an alternative embodiment, fan blade 140 is a fixed pitch fan blade rather than a variable pitch fan blade.

In the exemplary embodiment, power gear box 146 houses an epicyclic gear assembly 200. As described below in further detail with respect to FIG. 2, epicyclic gear assembly 200 includes a sun gear 202, a plurality of planet gears 204, a ring gear 206 and a carrier 208. In certain embodiments, carrier 208 couples to each side of planet gears 204. More specifically, carrier 208 is coupled to planet gears 204 by bearing pins 302 extending through planet gears 204.

In the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted by sequential stages of HP turbine stator vanes 168 that are coupled to outer casing 118 and HP turbine rotor blades 170 that are coupled to HP shaft or spool 134, thus inducing HP shaft or spool 134 to rotate, thereby supporting operation of HP compressor 124. Combustion gases 166 are then routed through LP turbine 130 where a second portion of thermal and kinetic energy is extracted from combustion gases 166 by sequential stages of LP turbine stator vanes 172 that are coupled to outer casing 118 and LP turbine rotor blades 174 that are coupled to LP shaft or spool 136, thus inducing LP shaft or spool 136 to rotate which induces power gear box 146 to rotate LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration. In still other embodiments, aspects of the present disclosure may be incorporated into any other suitable gas turbine engine. For example, in other embodiments, aspects of the present disclosure may be incorporated into, e.g., a turboprop engine.

Figure 2:
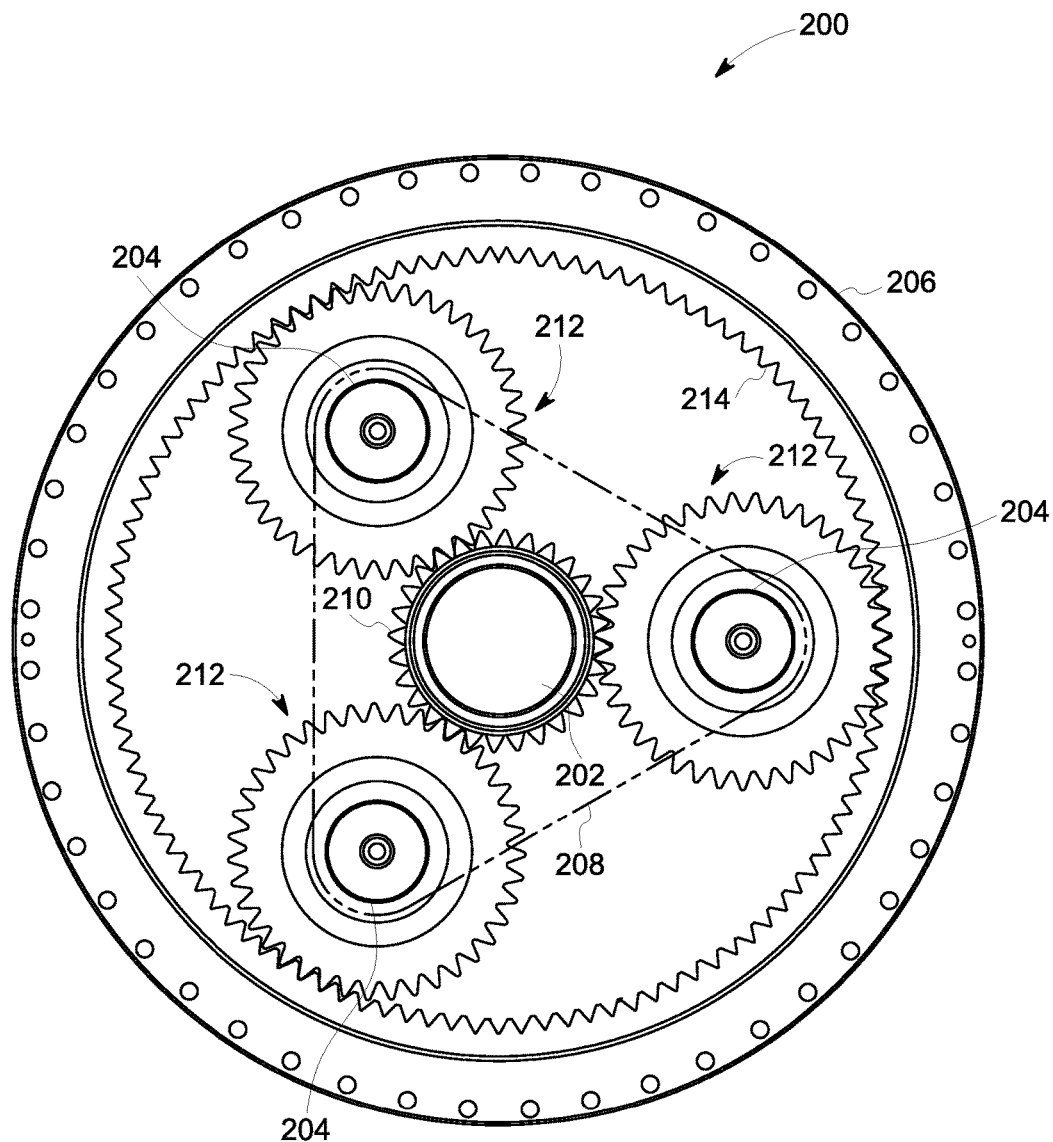
FIG. 2 is a schematic diagram of an exemplary epicyclic gear assembly of the gas turbine engine shown in FIG. 1.

FIG. 2 is a schematic diagram of epicyclic gear assembly 200 of exemplary gas turbine engine 110 (shown in FIG. 1). In the exemplary embodiment, epicyclic gear assembly 200 is a planetary gear assembly. In one embodiment, epicyclic gear assembly 200 is housed within power gearbox 146

(shown in FIG. 1). In other embodiments, epicyclic gear assembly 200 is located adjacent to power gearbox 146 and is mechanically coupled to it.

Epicyclic gear assembly 200 includes a sun gear 202, a plurality of planet gears 204, a ring gear 206, a carrier 208 coupled each side of planet gears 204. In alternative embodiments, epicyclic gear assembly 200 is not limited to three planet gears 204. Rather, any number of planet gears may be used that enables operation of epicyclic gear assembly 200 as described herein. In some embodiments, LP shaft or spool 136 (shown in FIG. 1) is fixedly coupled to sun gear 202. Sun gear 202 is configured to engage planet gears 204 through a plurality of complementary sun gear teeth 210 and a plurality of complementary planet gear teeth 212 circumferentially spaced about a radially outer periphery of sun gear 202 and a radially outer periphery of planet gears 204 respectively. Planet gears 204 are maintained in a position relative to each other by carrier 208. For example, in epicyclic gear assembly 200, each of planet gears 204 include a bearing pin assembly 302 configured to extend through planet gears 204 and to couple planet gears 204 to carrier 208. Planet gears 204 are configured to engage ring gear 206 through a plurality of complementary ring gear teeth 214 and complementary planet gear teeth 212 circumferentially spaced about a radially inner periphery of ring gear 206 and a radially outer periphery of planet gears 204 respectively. Ring gear 206 is rotationally coupled to fan blades 140 (shown in FIG. 1), disk 142 (shown in FIG. 1), and pitch change mechanism 144 (shown in FIG. 1) extending axially from ring gear 206. LP turbine 130 rotates the LP compressor 122 at a constant speed and torque ratio which is determined by a function of ring gear teeth 214, planet gear teeth 212, and sun gear teeth 210 as well as how power gearbox 146 is restrained.

Epicyclic gear assembly 200 may be configured in three possible configurations: planetary, star, and solar. In the planetary configuration, ring gear 206 remains stationary while sun gear 202, planet gears 204, and carrier 208 rotate. LP shaft or spool 136 drives sun gear 202 which is configured to rotate planet gears 204 that are configured to rotate carrier 208. Carrier 208 drives fan blades 140, disk 142, and pitch change mechanism 144. Sun gear 202 and carrier 208 rotate in the same direction.

In the star configuration, carrier 208 remains stationary while sun gear 202 and ring gear 206 rotate. LP shaft or spool 136 drives sun gear 202 which is configured to rotate planet gears 204. Planet gears 204 are configured to rotate ring gear 206 and carrier 208 is fixedly coupled to power gearbox 146. Carrier 208 maintains planet gears 204 positioning while allowing planet gears 204 to rotate. Ring gear 206 is rotationally coupled to fan blades 140, disk 142, and pitch change mechanism 144. Sun gear 202 and ring gear 206 rotate in opposite directions.

In the solar configuration, sun gear 202 remains stationary while planet gears 204, ring gear 206 and carrier 208 rotate. LP shaft or spool 136 may drive either the ring gear 206 or carrier 208. When LP shaft or spool 136 is coupled to carrier 208, planet gears 204 are configured to rotate ring gear 206 which drives fan blades 140, disk 142, and pitch change mechanism 144. Ring gear 206 and carrier 208 rotate in the same direction.

In the solar configuration where LP shaft or spool 136 is coupled to ring gear 206, ring gear 206 is configured to rotate planet gears 204, and carrier 208. Carrier 208 drives fan blades 140, disk 142, and pitch change mechanism 144. Ring gear 206 and carrier 208 rotate in the same direction.

During operation of epicyclic gear assembly 200, forces are transferred between planet gears 204 and carrier 208 through bearing pin assembly 302. More specifically, rotational forces applied to either of carrier 208 and ring gears 204 are transferred to ring gears 204 and carrier 208, respectively, through bearing pin assembly 302. For example, during operation in the planetary configuration of epicyclic gear assembly 200 (shown in FIG. 2), sun gear 202 is driven while ring gear 206 is kept stationary, thereby inducing rotation of planet gears 204, and carrier 208. Accordingly, in the planetary configuration, rotational force is transmitted from sun gear 202 to planet gears 204 and then from planet gears 204 to carrier 208 through bearing pin assembly 302. In the solar configuration, sun gear 202 remains stationary while one of carrier 208 and ring gear 206 is made to rotate. If carrier 208 is rotated, a force is imparted to planet gears 204 through bearing pin assembly 302. If ring gear 206 is rotated, planet gears 204 apply a force to carrier 208 through bearing pin assembly 302, thereby inducing carrier 208 to rotate.

Figure 3:
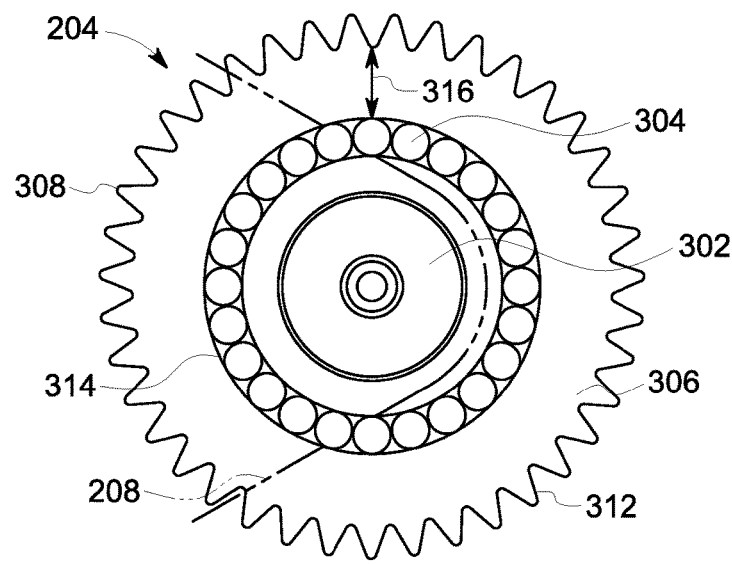
FIG. 3 is a schematic diagram of an exemplary planet gear of the epicyclic gear assembly shown in FIG. 2.

FIG. 3 is a schematic diagram of exemplary planet gear 204 of epicyclic gear assembly 200 (shown in FIG. 2). Planet gear 204 includes bearing pin assembly 302, a plurality of roller elements 304, a gear rim 306, and a plurality of teeth 308. Gear rim 306 includes an outer radial surface or gear root diameter 312, an inner radial surface 314, and a thickness 316. Carrier 208 (shown in FIG. 2) is coupled to bearing pin assembly 302. Roller elements 304 are disposed circumferentially around bearing pin assembly 302. Gear rim 306 circumscribes roller elements 304. Teeth 308 are disposed circumferentially about outer radial surface 312. Thickness 316 is the radial distance between outer radial surface or gear root diameter 312 and inner radial surface 314.

Figure 4:
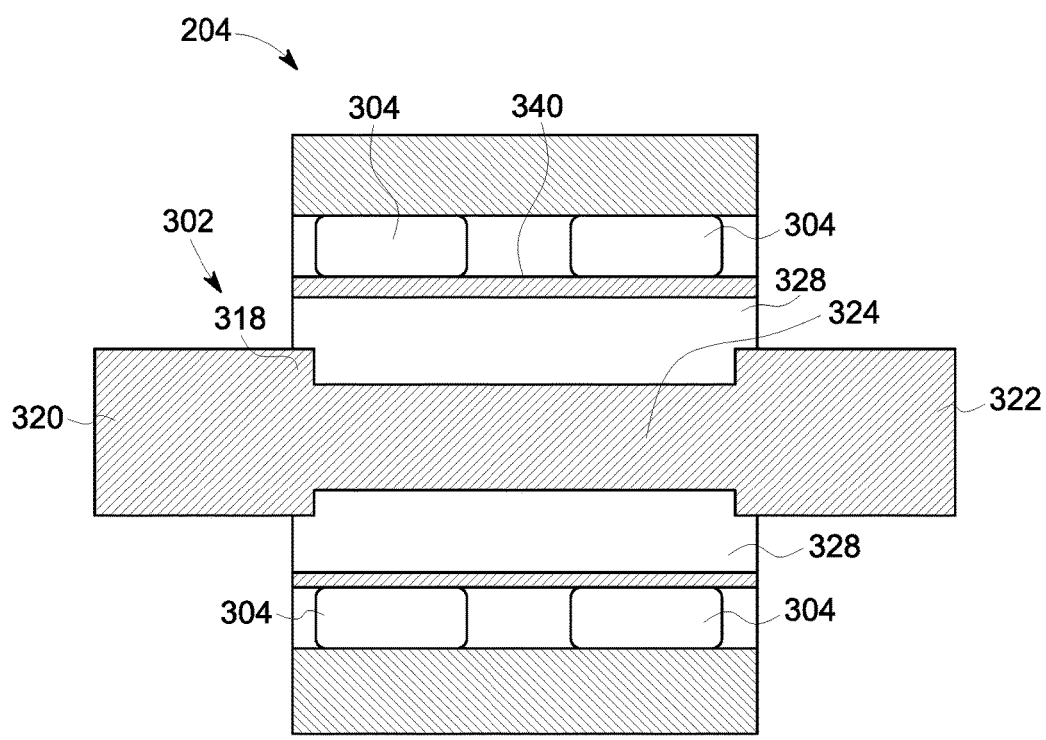
FIG. 4 is a cross-sectional view of the planet gear shown in FIG. 3 in an unloaded state.
Figure 5:
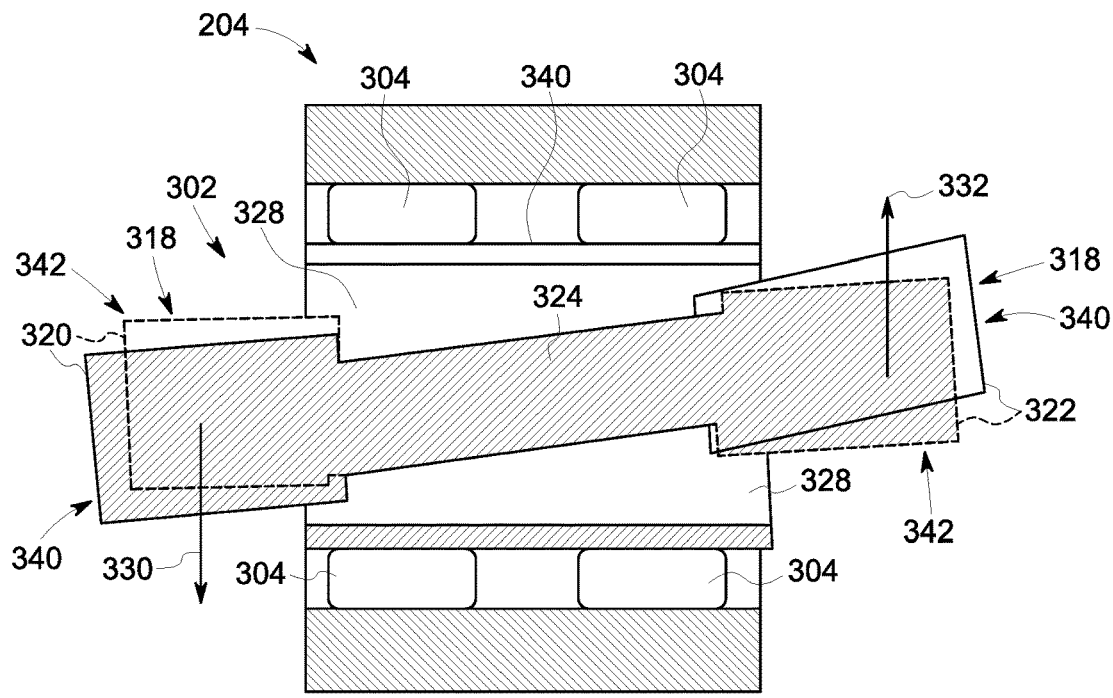
FIG. 5 is a cross-sectional view of the planet gear shown in FIG. 3 in a loaded state within a range of loaded states.

FIGS. 4 and 5 are cross-sectional side views of planet gear 204 in an unloaded state and a loaded state within a range of loaded states, respectively. Bearing pin assembly 302 is substantially rigid and extends axially through planet gear 204. Bearing pin assembly 302 includes a bearing pin 318 that includes a forward end 320 and an aft end 322 opposite forward end 320. Bearing pin 318 is either solid or hollow. Bearing pin 318 further includes a substantially rigid pin body 324 disposed between, and coupled to, forward end 320 and aft end 322. Bearing pin assembly 302 also includes a resilient section 328 that surrounds rigid pin body 324 and induces a bias in bearing pin assembly 302 to facilitate returning bearing pin assembly 302 to the unloaded state shown in FIG. 4 from the loaded states shown in FIG. 5. Resilient section 328 is manufactured from at least one material with a known stiffness, e.g., and without limitation, a polymer or an elastomer. Forward end 320 and aft end 322 are each coupled to a carrier, such as carrier 208 (shown in FIG. 2), to facilitate transmission of forces between bearing pin assembly 302 and carrier 208 during operation. A plurality of roller elements 304 are disposed between bearing pin assembly 302 and gear rim 306 to facilitate relative rotation of bearing pin assembly 302 and gear rim 306 during operation. In the unloaded state shown in FIG. 4, an outer surface 340 of bearing pin 318 is configured to be in contact with roller elements 304.

During operation, and as shown in FIG. 5, rigid bearing pin 318 becomes loaded due to transmission of forces between planet gear 204 and carrier 208 (shown in FIGS. 1 and 2). As a result of the coupling between planet gear 204 and carrier 208, forward end 320 experiences a first force 330 while aft end 322 experiences a second force 332 in a substantially opposite direction as first force 330, thereby creating a moment on bearing pin 318. The moment applied to bearing pin 318 during operation induces deformation of bearing pin 318. In response to a moment being applied to bearing pin 318, resilient section 328 is configured to partially compress and to partially expand to maintain contact between outer surface 340 and roller elements 304. More specifically, resilient section 328 induces rigid pin body 324 to behave in a spring-like manner, such that resilient section 328 compresses when experiencing a compressive load and to expand in the absence of a load. Two loaded states are shown in FIG. 5, i.e., a first, static loaded state 342 and a second, elastic loaded state 344. In the static loaded state 342, the shape of bearing pin 318 is substantially unchanged and bearing pin 318 assumes an inclined position within the constraints of bearing pin assembly 302 and planet gear 204. In the elastic loaded state 344, the shape of bearing pin 318 is altered and nearing pin 318 assumes some temporary elastic deformation within the constraints of bearing pin assembly 302 and planet gear 204. Therefore, the motion of bearing pin 318 will result in either static loaded state 342, elastic loaded state 344, or some combination of both states 342 and 344.

In the exemplary embodiment, rigid bearing pin 302 is formed unitarily of a sintered metal material, using for example, an additive manufacturing process. In the exemplary embodiment, the sintered metal material comprises steel or a steel alloy. In alternative embodiments, the sintered metal material comprises a superalloy material, such as, but not limited to cobalt chrome and austenite nickel-chromium-based superalloys. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, and freeform fabrication. One exemplary type of additive manufacturing process uses a laser beam to sinter or melt a powder material. Additive manufacturing processes may employ powder materials or wire as a raw material. Moreover, additive manufacturing processes may generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer.

In other embodiments, bearing pin 318 is formed from one or more components coupled together using processes including, without limitation, brazing, and diffusion bonding. For example, in certain embodiments bearing pin 318 is formed from multiple pieces that may be individually manufactured and that are then brazed, diffusion bonded, or otherwise joined into a unitary body. Individual pieces of bearing pin 318 may be formed using various techniques including, without limitation, additive manufacturing, machining, forming, welding, and any combination thereof.

Figure 6:
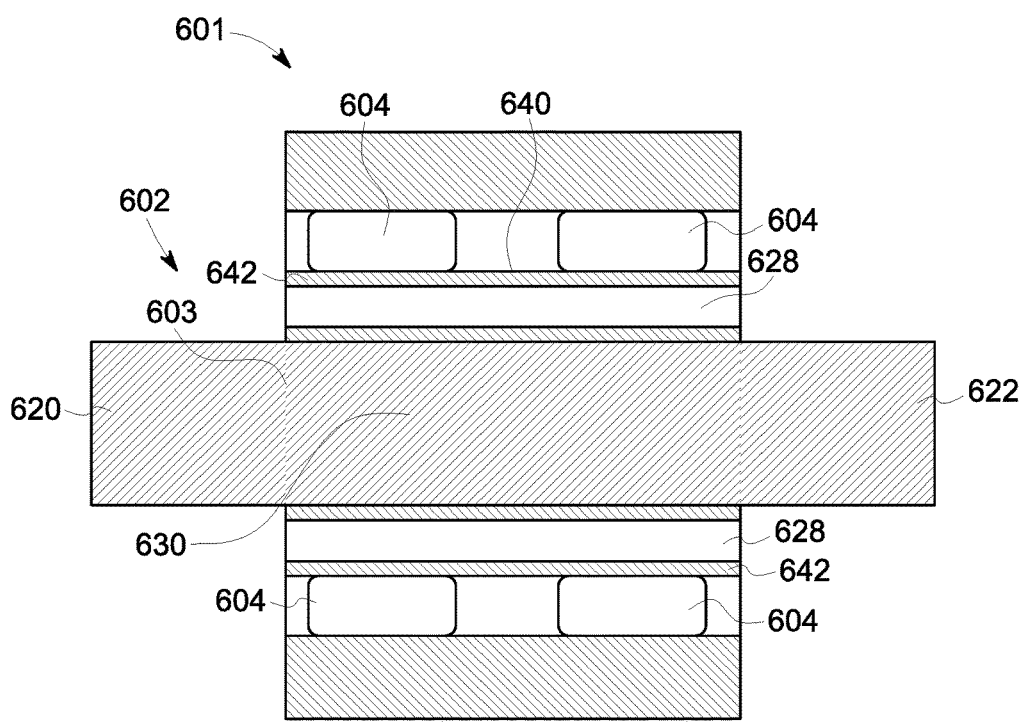
FIG. 6 is a cross-sectional view of an alternative planet gear that may be used in the epicyclic gear assembly shown in FIG. 2.

FIG. 6 is a cross-sectional side view of an alternative planet gear 601 that for use in epicyclic gear assembly 200 (shown in FIG. 2). Planet gear 601 includes a bearing pin assembly 602 that includes a bearing pin 603 extending axially through planet gear 601. Bearing pin 603 is either solid or hollow. Bearing pin 603 includes a forward end 620 and an aft end 622 axially opposite forward end 620. Bearing pin 603 also includes a substantially rigid pin body 630 including forward end 620 and aft end 622. Bearing pin assembly 602 also includes an annular sleeve 642 that extends about, in an annular relationship, pin body 630 and through which pin body 630 axially extends. Annular sleeve 642 includes a resilient section 628 such that when annular sleeve 642 is coupled to pin body 630, resilient section 628 is disposed between forward end 620 and aft end 622. Resilient section 628 is manufactured from at least one material with a known stiffness, e.g., and without limitation, a polymer or an elastomer. During operation, an outer surface 640 of bearing pin assembly 602 is configured to be in substantially even contact with a plurality of roller elements 604 due to expansion and compression of resilient section 628.

Figure 7:
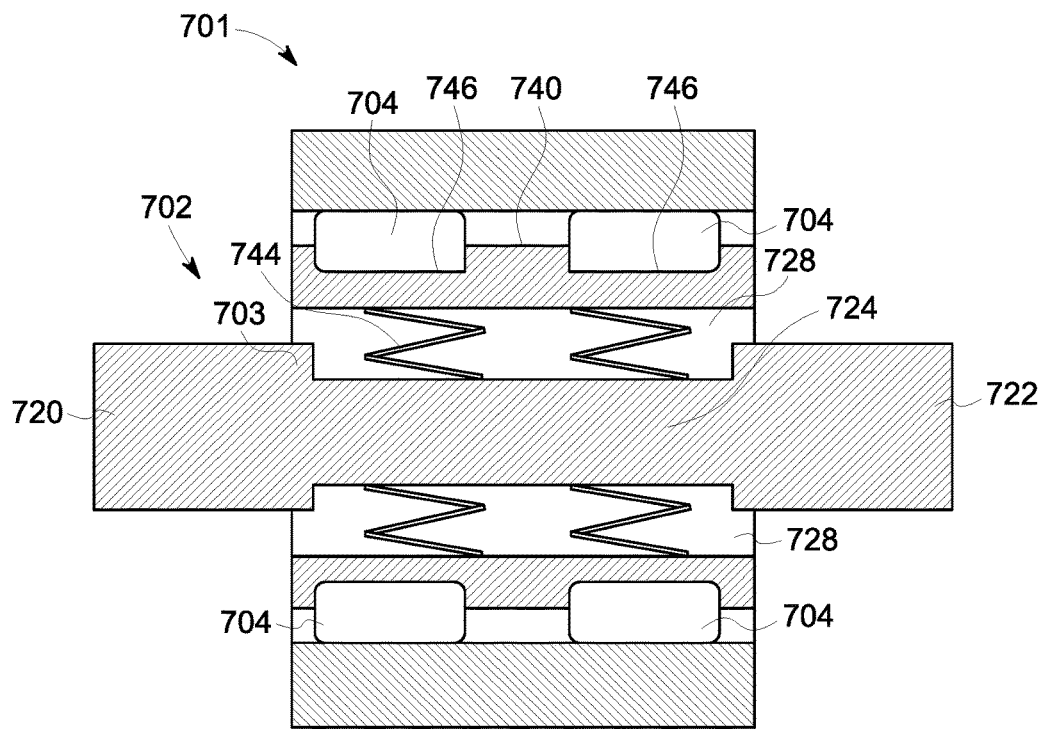
FIG. 7 is a cross-sectional side view of another alternative planet gear that may be used in the epicyclic gear assembly shown in FIG. 2.

FIG. 7 is a cross-sectional side view of another alternative planet gear 701 that may be used in epicyclic gear assembly 200 (shown in FIG. 2). A bearing pin assembly 702 extends axially through planet gear 701. Bearing pin assembly 702 includes a bearing pin 703 that includes a forward end 720 and an aft end 722 axially opposite forward end 720. Bearing pin 703 is either solid or hollow. Bearing pin 703 further includes a substantially rigid pin body 724 disposed between, and coupled to, forward end 720 and aft end 722. Bearing pin assembly 702 also includes a resilient section 728 that extends about pin body 724. Resilient section 728 is manufactured from at least one material with a known stiffness, e.g., and without limitation, a polymer or an elastomer. Disposed within resilient section 728 are spring elements 744. In certain embodiments, spring elements 744 are initially separate from resilient section 728 and are disposed within resilient section 728 during fabrication. In other embodiments, spring elements 744 are integrally formed with resilient section 728. For example, in certain embodiments, spring elements 744 are formed within resilient section 728 using additive manufacturing. Spring elements 744 are shown in FIG. 7 as helical springs. In other embodiments, other spring types are used including, without limitation, disc springs, beam springs, wave springs, and bellows. During operation, an outer surface 740 of bearing pin assembly 702 is configured to be in substantially even contact with a plurality of roller elements 704 due to expansion and compression of resilient section 728 facilitated, at least in part, by spring elements 744. To facilitate retention of roller elements 704, outer surface 740 defines bearing races 746 within which roller elements 704 are retained during operation. Bearing races 746 are integrally formed with bearing pin 702. In certain embodiments, bearing races 746 are formed into bearing pin 703 by applying a material removal operation, such as a machining operation, to bearing pin 703. In other embodiments, bearing races 746 are built up using an additive manufacturing process. In either or both cases, a post finishing heat treatment may be applied such as carburizing and/or nitriding to harden the bearing races 746.

Figure 8:
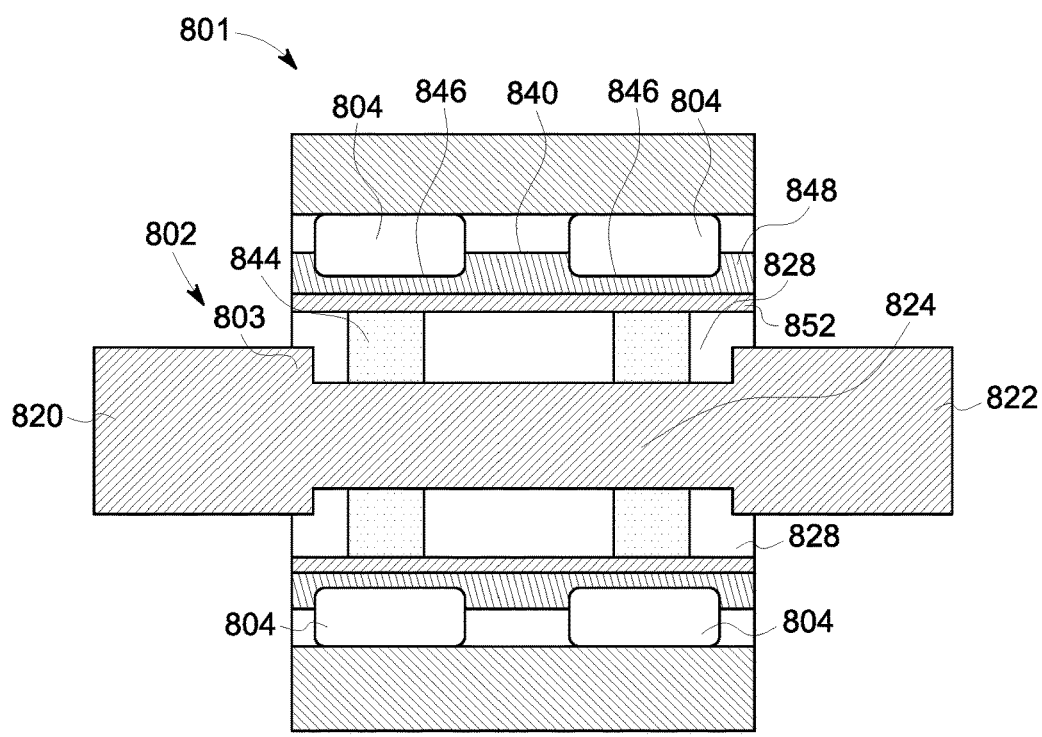
FIG. 8 is a cross-sectional side view of yet another planet gear that may be used in the epicyclic gear assembly shown in FIG. 2.

FIG. 8 is a cross-sectional side view of yet another alternative planet gear 801 that may be used in epicyclic gear assembly 200 (shown in FIG. 2). A bearing pin assembly 802 extends axially through planet gear 801. Bearing pin assembly 802 includes a bearing pin 803 that includes a forward end 820 and an aft end 822 axially opposite forward end 820. Bearing pin 803 is either solid or hollow. Bearing pin 803 includes a bearing pin core 852 and a bearing race insert 848 coupled to bearing pin core 852. In certain embodiments, bearing race insert 848 is coupled to bearing pin core 852 by methods including, without limitation, press fitting. Bearing pin 803 also includes a substantially rigid pin body 824 disposed between, and coupled to, forward end 820 and aft end 822. Bearing pin assembly 802 also includes a resilient section 828 extending about rigid pin body 824. Resilient section 828 is manufactured from at least one material with a known stiffness, e.g., and without limitation, a polymer or an elastomer. Disposed within resilient section 828 are spring elements 844. In bearing pin 802, resilient section 828 is generally formed of a first material having a first stiffness. Spring elements 844 are formed of a second material having a second stiffness that is less than the first stiffness of resilient section 828. For example, in certain embodiments, spring elements 844 are formed of one or more materials including, without limitation, a metal such as aluminum, titanium, lead, magnesium, or other metal having a modulus lower than the first material, i.e., lower than the polymer or elastomer that resilient section 828 is manufactured from. During operation, an outer surface 840 of bearing pin assembly 802, and more specifically bearing race insert 848, is configured to be in substantially even contact with a plurality of roller elements 804 due to expansion and compression of resilient section 828 facilitated, at least in part, by spring elements 844. To facilitate retention of roller elements 804, outer surface 840 defines bearing races 846 within which roller elements 804 are retained during operation.

The above-described bearing pin assemblies provide an efficient method for efficient load distribution between the bearing pin and roller elements of a gear in which the bearing pin is implemented. Specifically, the bearing pin assembly includes a rigid body surrounded by a resilient section. During operation, the resilient section facilitates expansion and compression of the rigid pin body in response to operational loads such that an outer surface of the bearing pin maintains substantially even contact with roller elements disposed between the bearing pin and a gear rim of the gear. In certain embodiments, spring elements are disposed within the resilient section to further facilitate expansion and compression of the pin body. By maintaining alignment and contact between the bearing pin outer surface and roller elements, the roller elements are subjected to more uniform loading across their length, thereby extending the life of the roller elements. Moreover, the improved alignment between the bearing pin and roller elements facilitates more efficient transfer of forces between the gear and components to which the gear is coupled by the bearing pin, such as a carrier of an epicyclic gear assembly.

An exemplary technical effect of the methods, systems, and apparatus described herein includes at least one of: (a) improving the relative alignment of contact surfaces of the bearing pin and roller elements during operation of the gear; (b) decreasing wear on roller elements; (c) improving force transmission between the gear, the bearing pin, and structures to which the gear are coupled by the bearing pin; (d) increasing the reliability of the gear; (e) increasing the efficiency of an epicyclic gear assembly; and (f) increasing the power output of an epicyclic gear assembly.

Exemplary embodiments of a bearing pin assembly are described above in detail. The bearing pin is not limited to the specific embodiments described herein, but rather, components of systems and/or steps of the methods may be utilized independently and separately from other components and/or steps described herein. For example, the methods may also be used in combination with other systems which require a gear, and are not limited to practice with only the systems and methods as described herein. Rather, the exemplary embodiment may be implemented and utilized in connection with many other machinery applications that require bearing pins.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing pin assembly comprising:
   a bearing pin comprising a substantially rigid pin body;
   a resilient section disposed about said substantially rigid pin body, said resilient section configured to facilitate bending of said bearing pin during operational loading of said bearing pin;
   at least one spring element disposed within said resilient section; and
   wherein said resilient section comprises a first material having a first material stiffness and said at least one spring element comprises a second material having a second material stiffness, wherein the second material stiffness is less than the first material stiffness.

2. The bearing pin assembly in accordance with claim 1, wherein said resilient section comprises an annular sleeve coupled to said substantially rigid pin body, wherein said substantially rigid pin body extends axially through said annular sleeve.

3. The bearing pin assembly in accordance with claim 1, wherein said bearing pin comprises a forward end and an aft end axially opposite said forward end, said substantially rigid pin body extends between said forward end and said aft end.

4. The bearing pin assembly in accordance with claim 1, wherein said at least one spring element is integrally formed with said resilient section.

5. The bearing pin assembly in accordance with claim 1, wherein said at least one spring element is one of a helical spring, a disc spring, a beam spring, a wave spring, and a bellows.

6. The bearing pin assembly in accordance with claim 1, wherein said second material is one of aluminum, titanium, lead, magnesium, and a polymer.

7. A gear having an axis of rotation, said gear comprising:
   an outer gear rim;
   a plurality of roller elements disposed about the axis of rotation and radially inward of said outer gear rim;
   a bearing pin assembly extending through said outer gear rim along the axis of rotation, said bearing pin assembly comprising:
   a bearing pin comprising a substantially rigid pin body; and
   a resilient section disposed about said substantially rigid pin body, said resilient section configured to facilitate bending of said bearing pin during operational loading of said bearing pin;
   at least one spring element disposed within said resilient section; and wherein said resilient section comprises a first material having a first material stiffness and said at least one spring element comprises a second material having a second material stiffness, wherein the second material stiffness is less than the first material stiffness.

8. The gear in accordance with claim 7, wherein said resilient section comprises an annular sleeve coupled to said substantially rigid pin body, wherein said substantially rigid pin body extends axially through said annular sleeve.

9. The gear in accordance with claim 7, wherein said bearing pin comprises a forward end and an aft end axially opposite said forward end, said substantially rigid pin body extends between said forward end and said aft end.

10. The gear in accordance with claim 7, wherein said at least one spring element is integrally formed with said resilient section.

11. The gear pin in accordance with claim 10, wherein said at least one spring element is one of a helical spring, a disc spring, a beam spring, a wave spring, and a bellows.

12. The gear in accordance with claim 7, wherein said second material is one of aluminum, titanium, lead, magnesium, and a polymer.

13. An epicyclic gear assembly comprising:
   a sun gear;
   a ring gear;
   a plurality of planet gears coupled to said ring gear and said sun gear, at least one planet gear of said plurality of planet gears having an axis of rotation, said at least one planet gear comprising:
      an outer gear rim;
      a plurality of roller elements disposed about the axis of rotation and radially inward of said outer gear rim; and
      a bearing pin assembly extending through said outer gear rim along the axis of rotation, said bearing pin assembly comprising:
         a bearing pin comprising a substantially rigid pin body; and
         a resilient section disposed about said substantially rigid pin body, said resilient section configured to facilitate bending of said bearing pin during operational loading of said bearing pin; and
      at least one spring element disposed within said resilient section, wherein said resilient section comprises a first material having a first material stiffness and said at least one spring element comprises a second material having a second material stiffness, wherein the second material stiffness is less than the first material stiffness.

14. The epicyclic gear assembly in accordance with claim 13, wherein said resilient section comprises an annular sleeve coupled to said substantially rigid pin body, wherein said substantially rigid pin body extends axially through said annular sleeve.

15. The epicyclic gear assembly in accordance with claim 13, further comprising at least one spring element disposed within said resilient section, wherein said at least one spring element is one of a helical spring, a disc spring, a beam spring, a wave spring, and a bellows.

* * * * *